(12) United States Patent
Schmidt et al.

(10) Patent No.: US 10,753,416 B1
(45) Date of Patent: Aug. 25, 2020

(54) WEAR MONITORING DEVICE FOR AIRCRAFT BRAKES

(71) Applicant: GOODRICH CORPORATION, Charlotte, NC (US)

(72) Inventors: Wade R. Schmidt, Pomfret Center, CT (US); Sameh Dardona, South Windsor, CT (US); Paul Sheedy, Bolton, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/429,459

(22) Filed: Jun. 3, 2019

(51) Int. Cl.
*F16D 66/00* (2006.01)
*F16D 66/02* (2006.01)

(52) U.S. Cl.
CPC .......... *F16D 66/024* (2013.01); *F16D 66/027* (2013.01)

(58) Field of Classification Search
CPC ............................. F16D 66/024; F16D 66/027
USPC ....................................................... 340/454
See application file for complete search history.

(56) References Cited

U.S. PATENT DOCUMENTS

| | | | | |
|---|---|---|---|---|
| 3,783,979 A * | 1/1974 | Hess | ...................... | F16D 66/024 188/1.11 R |
| 4,184,145 A * | 1/1980 | Fima | ...................... | F16D 66/024 116/208 |
| 4,204,190 A | 5/1980 | Wiley et al. | | |
| 5,347,858 A * | 9/1994 | Ito | ...................... | F16D 66/024 340/454 |
| 5,839,545 A * | 11/1998 | Preston | ...................... | F16D 66/024 188/1.11 L |
| 5,999,093 A * | 12/1999 | Hanisko | ...................... | F16D 66/021 340/453 |
| 6,450,300 B1 | 9/2002 | Kramer | | |
| 7,877,216 B2 | 1/2011 | Wright et al. | | |
| 8,310,356 B2 | 11/2012 | Evans et al. | | |
| 8,860,566 B2 | 10/2014 | Elstorpff | | |
| 9,939,247 B1 | 4/2018 | Dardona et al. | | |
| 10,167,916 B2 | 1/2019 | Lin et al. | | |
| 2003/0006896 A1* | 1/2003 | Passwater | ...................... | F16D 66/00 340/454 |
| 2010/0286881 A1* | 11/2010 | Cahill | ...................... | B60T 8/00 701/70 |
| 2011/0226564 A1* | 9/2011 | Salapic | ...................... | F16D 66/021 188/1.11 W |
| 2012/0193177 A1* | 8/2012 | Goto | ...................... | B60T 13/741 188/161 |
| 2013/0299289 A1* | 11/2013 | Eichler | ...................... | F16D 66/027 188/251 R |
| 2014/0245824 A1* | 9/2014 | Bosis | ...................... | F16D 66/024 73/129 |
| 2015/0041258 A1* | 2/2015 | Asen | ...................... | B60T 17/22 188/1.11 L |

(Continued)

*Primary Examiner* — Ojiako K Nwugo
(74) *Attorney, Agent, or Firm* — Snell & Wilmer LLP (57) ABSTRACT

A system for monitoring incursion depth of a disk having an outer surface for use in a disk brake system includes a plurality of conductive leads each configured to be located at different distances from the outer surface of the disk. The system further includes a plurality of resistors each coupled to one of the plurality of conductive leads such that total resistance across the plurality of conductive leads changes in response to disconnection of one or more of the plurality of conductive leads caused by wearing of the outer surface of the disk.

18 Claims, 6 Drawing Sheets

(56) References Cited

U.S. PATENT DOCUMENTS

| | | | |
|---|---|---|---|
| 2015/0152931 A1* | 6/2015 | Moore | F16D 66/022 |
| | | | 188/1.11 L |
| 2017/0184169 A1 | 6/2017 | Dohle et al. | |
| 2018/0097883 A1* | 4/2018 | Chow | H04L 67/12 |
| 2018/0223935 A1* | 8/2018 | Eden | F16D 66/024 |
| 2019/0101173 A1 | 4/2019 | Mohseni et al. | |
| 2019/0225202 A1* | 7/2019 | Juzswik | B60T 8/34 |

* cited by examiner

WEAR MONITORING DEVICE FOR AIRCRAFT BRAKES

FIELD

The present disclosure relates to disk brakes and, more particularly, to systems and methods for monitoring wear of disks of disk brakes.

BACKGROUND

Disk brake systems include a plurality of rotating friction disks, or rotors, and a plurality of non-rotating friction disks, or stators. The rotors may be coupled to a wheel assembly and may rotate with the wheel assembly. The stators may be coupled to a fixed (relative to the wheel assembly) structure and may fail to rotate with the wheel. An actuator may apply a force to the friction disks to compress the rotors and stators. Friction between the rotors and stators may slow rotation of the wheel assembly. After a period of use, the rotors and stators may experience wear.

SUMMARY

Disclosed herein is a system for monitoring incursion depth of a disk having an outer surface for use in a disk brake system. The system includes a plurality of conductive leads each configured to be located at different distances from the outer surface of the disk. The system further includes a plurality of resistors each coupled to one of the plurality of conductive leads such that total resistance across the plurality of conductive leads changes in response to disconnection of one or more of the plurality of conductive leads caused by wearing of the outer surface of the disk.

Any of the foregoing embodiments may further include an antenna configured to transmit an output signal and receive a power signal; and a controller coupled to the antenna and the plurality of conductive leads and configured to receive the power signal from the antenna and to control the antenna to transmit the output signal corresponding to the total resistance across the plurality of conductive leads.

Any of the foregoing embodiments may further include a current source coupled to the plurality of conductive leads and a controller coupled to the plurality of conductive leads and configured to detect a voltage across the plurality of conductive leads, the voltage across the plurality of conductive leads corresponding to the total resistance across the plurality of conductive leads.

Any of the foregoing embodiments may further include the disk having a carbon material, wherein the plurality of conductive leads are formed using the carbon material.

In any of the foregoing embodiments, each of the plurality of resistors are coupled together in parallel.

In any of the foregoing embodiments, each of the plurality of resistors have a different resistance value.

In any of the foregoing embodiments, the disk is a rotatable friction disk or a non-rotatable friction disk.

Any of the foregoing embodiments may also include a second plurality of conductive leads each configured to be located at different distances from a second outer surface of the disk; and a second plurality of resistors each coupled to one of the second plurality of conductive leads such that a second total resistance across the second plurality of conductive leads changes in response to disconnection of one or more of the second plurality of conductive leads caused by wearing of the second outer surface of the disk.

Also disclosed is a disk for use in a disk brake system. The disk includes an outer surface. The disk further includes a plurality of conductors located at different distances from the outer surface of the disk. The disk further includes a resistor coupled to each one of the plurality of conductors such that total resistance across the plurality of conductors changes in response to disconnection of one or more of the plurality of conductors caused by wearing of the outer surface of the disk.

Any of the foregoing embodiments may further include an antenna configured to transmit an output signal and receive a power signal; and a controller coupled to the antenna and the plurality of conductors and configured to receive the power signal from the antenna and to control the antenna to transmit the output signal corresponding to the total resistance across the plurality of conductors.

Any of the foregoing embodiments may further include a current source coupled to the plurality of conductors and a controller coupled to the plurality of conductors and configured to detect a voltage across the plurality of conductors, the voltage across the plurality of conductors corresponding to the total resistance across the plurality of conductors.

In any of the foregoing embodiments, the disk includes a carbon material, and the plurality of conductors are formed using the carbon material.

In any of the foregoing embodiments, the resistor coupled to each one of the plurality of conductors are coupled together in parallel.

In any of the foregoing embodiments, the resistor coupled to each one of the plurality of conductors have a different resistance value.

In any of the foregoing embodiments, the disk is a rotatable friction disk or a non-rotatable friction disk.

Any of the foregoing embodiments may further include a second outer surface; a second plurality of conductors each located at different distances from the second outer surface of the disk; and a second resistor coupled to each one of the second plurality of conductors such that a second total resistance across the second plurality of conductors changes in response to disconnection of one or more of the second plurality of conductors caused by wearing of the second outer surface of the disk.

Also disclosed is a method for monitoring incursion depth of a disk having an outer surface for use in a disk brake system. The method includes providing a current to a plurality of conductive leads each placed at different distances from the outer surface of the disk and each connected to one of a plurality of resistors. The method also includes measuring a voltage across the plurality of conductive leads. The method also includes analyzing the voltage to determine an amount of wear of the disk.

In any of the foregoing embodiments, each of the plurality of resistors are coupled together in parallel.

In any of the foregoing embodiments, each of the plurality of resistors have a different resistance value.

In any of the foregoing embodiments, the disk is a rotatable friction disk or a non-rotatable friction disk.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
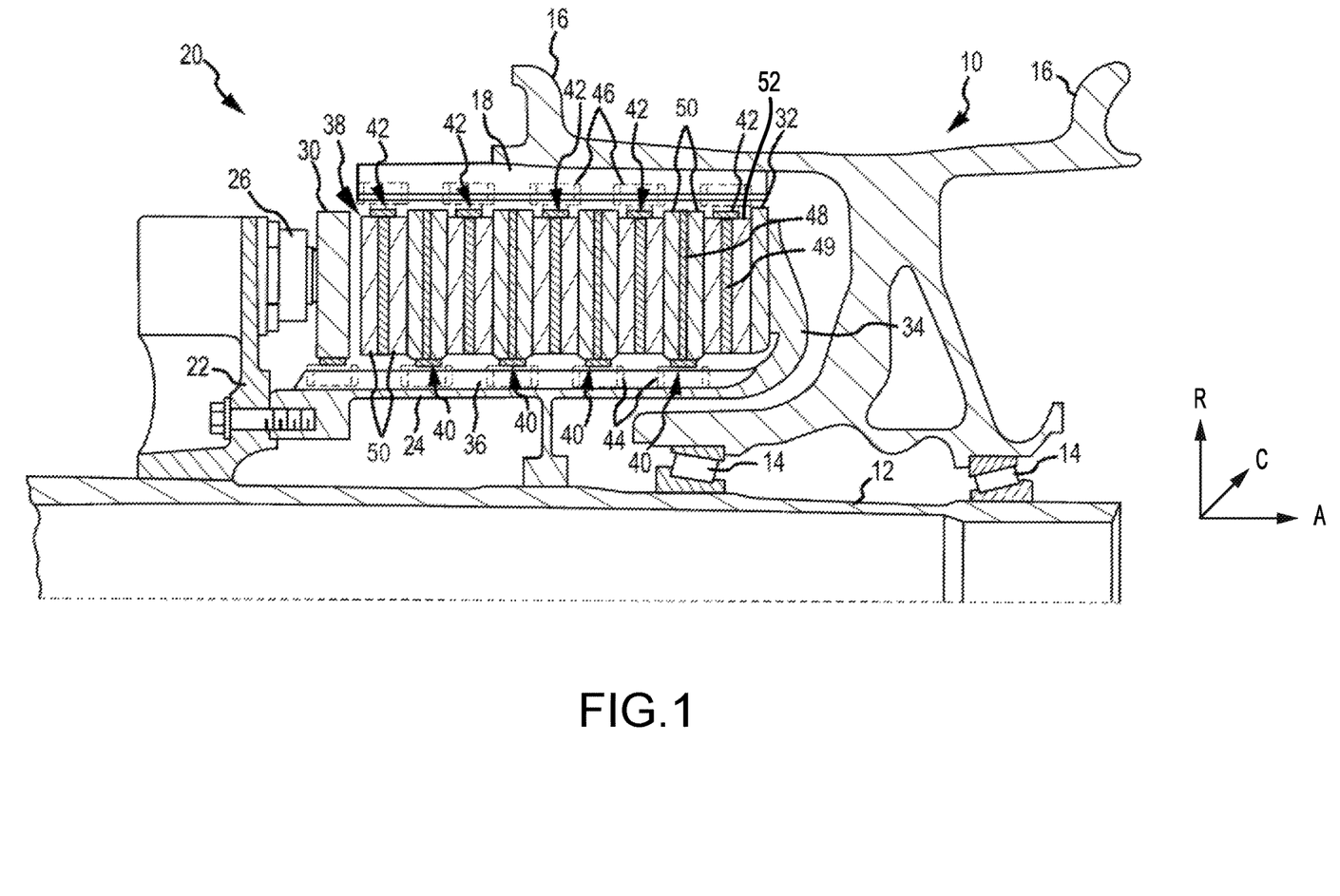
FIG. 1 illustrates a cross-sectional view of a multi-disk brake system, in accordance with various embodiments.

Referring to FIG. 1, a multi-disk brake system 20 is illustrated according to various embodiments. The system may include a wheel 10 supported for rotation around the axle 12 by bearings 14. The axle 12 defines an axis of multi-disk brake system 20 and the various components thereof described herein, and any reference to the terms axis and axial may include an axis of rotation defined by axle 12 or a dimension parallel to such axis. The wheel 10 includes rims 16 for supporting a tire, and a series of axially extending rotor splines 18 (one shown). Rotation of the wheel 10 is modulated by the multi-disk brake system 20. The multi-disk brake system 20 includes a torque flange 22, a torque tube 24, a plurality of pistons 26 (one shown), a pressure plate 30, and an end plate 32. The torque tube 24 may be an elongated annular structure that includes a reaction plate 34 and a series of axially extending stator splines 36 (one shown). The reaction plate 34 and the stator splines 36 may be integral with the torque tube 24, as shown in FIG. 1, or attached as separate components.

The multi-disk brake system 20 also includes a plurality of friction disks 38. Each friction disk 38 may comprise a friction disk core. The plurality of friction disks 38 includes at least one friction disk with a non-rotatable core, also known as a stator 40, and at least one friction disk with a rotatable core, also known as a rotor 42. The stators 40 and rotors 42 may be located adjacent to one another in the multi-disk brake system 20, forming a plurality of adjacent stator-rotor pairs. The stators 40 may comprise a stator core 48 and wear liners 50. The rotors 42 may comprise a rotor core 49 and wear liners 52. Each friction disk 38 includes an attachment structure. In the embodiment of FIG. 1, each of the four stators 40 includes a plurality of stator lugs 44 at circumferentially spaced positions around stator 40 as an attachment structure. Similarly, each of the five rotors 42 includes a plurality of rotor lugs 46 at circumferentially spaced positions around the rotor 42 as an attachment structure. In the embodiment of FIG. 1, the pressure plate 30, the end plate 32, and the friction disks 38 are all annular structures made at least partially from a carbon composite material.

Torque flange 22 may be mounted to the axle 12. The torque tube 24 is bolted to the torque flange 22 such that the reaction plate 34 is near an axial center of the wheel 10. The end plate 32 is connected to a surface of the reaction plate 34 facing axially inward. Thus, the end plate 32 is non-rotatable by virtue of its connection to the torque tube 24. The stator splines 36 support the pressure plate 30 so that the pressure plate 30 is also non-rotatable. The stator splines 36 also support the stators 40 via stator cores 48. The stator cores 48 engage the stator splines 36 with gaps formed between the stator lugs 44. Similarly, the rotors 42 engage rotor splines 18 via the rotor core 49 with gaps formed between the rotor lugs 46. Thus, the rotor cores 49 of the rotors 42 are rotatable by virtue of their engagement with the rotor splines 18 of the wheel 10.

As shown in FIG. 1, the rotors 42 with the rotor cores 49 are arranged with the end plate 32 on one end, the pressure plate 30 on the other end, and the stators 40 with stator cores 48 interleaved so that the rotors 42 with the rotor cores 49 are directly or indirectly adjacent to non-rotatable friction components. Pistons 26 are connected to the torque flange 22 at circumferentially spaced positions around the torque flange 22. The pistons 26 face axially toward the wheel 10 and contact a side of the pressure plate 30 opposite the friction disks 38. The pistons 26 may be powered electrically, hydraulically, or pneumatically.

In various embodiments, in response to actuation of the pistons 26, a force, towards the reaction plate 34, is exerted on the rotatable friction disks 42 and the non-rotatable friction disks 40. The rotatable friction disks 42 and the non-rotatable friction disks 40 may thus be pressed together between the pressure plate 30 and the end plate 32.

After a sufficient amount of use, one or more of the rotatable friction disks 42 or the non-rotatable friction disks 40 may experience wear on an outer surface. It may be desirable to monitor the amount of wear experienced by the various disks so that replacement of the disks can occur at an optimal time.

Figure 2:
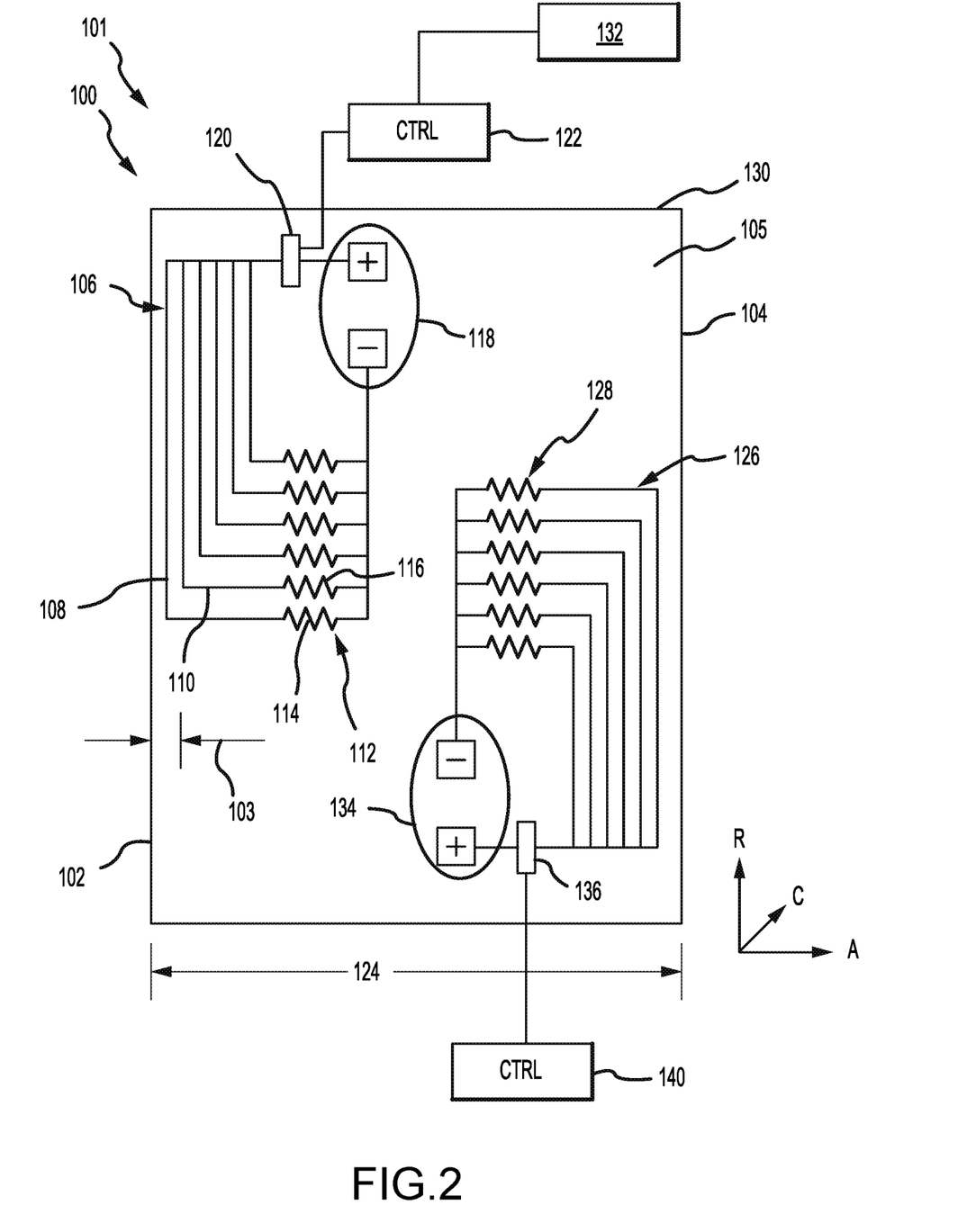
FIG. 2 is a cross-sectional view of a disk of the multi-disc brake system of FIG. 1 having a system for monitoring wear of the disk in accordance with various embodiments.

In that regard and referring to FIG. 2, a disk 100 may include a system 101 for monitoring incursion depth, or wear, of the disk 100. The disk 100 may be used as a rotatable friction disk, or rotor, 42 or as a non-rotatable friction disk, or stator, 40 of the multi-disk brake system 20 of FIG. 1. In various embodiments, the disk 100 may include a carbon material. The disk 100 may include a first outer surface 102 and a second outer surface 104 opposing the first outer surface 102. The first outer surface 102 and the second outer surface 104 may each be wear surfaces. That is, one or both of the first outer surface 102 and the second outer surface 104 may be designed to contact an adjacent disc.

The system 101 may be formed on a substrate 105. For example, the substrate 105 may include a similar or the same material as the disk 100, such as a carbon or carbon-based material. In various embodiments, the substrate 105 may be coated with a dielectric (which may include electrically insulating properties). The dielectric may include, for example, a glass-based coating or an oxide-based material. In various embodiments, the substrate 105 may include a different dielectric or electrically-insulating material which may have appropriate wear properties so as to not disrupt the overall braking system.

The system 101 may include a plurality of conductive leads 106 (including a first conductive lead 108 and a second conductive lead 110) adjacent to the outer surface 102 and each located a different distance from the outer surface 102. For example, the first conductive lead 108 may be located 0.039 inches (1 millimeter (mm)), 0.079 inches (2 mm), 0.20 inches (5 mm), or the like away from the outer surface 102, and the second conductive lead 110 may be located 0.079 inches (2 mm), 0.16 inches (4 mm), 0.39 inches (10 mm), or the like away from the outer surface 102. In various embodiments, each of the conductive leads 106 may be located equidistant from an adjacent conductive lead 106, or the distances between conductive leads 106 may vary.

The conductive leads 106 may include one or more of tungsten, palladium, copper, platinum, refractory metals, ceramic oxides, rhodium, ceramics, refractory ceramics, carbonaceous material, other metal-containing compounds, or the like. In various embodiments, the carbon of the disk 100 may be used as the conductive leads 106 by isolating carbon traces with one or more electrical insulator.

The system 101 may further include a plurality of resistors 112 (including a first resistor 114 and a second resistor 116). Each of the plurality of resistors 112 may be coupled to one of the plurality of conductive leads 106. For example, the first resistor 114 may be connected to the first conductive lead 108 and the second resistor 116 may be connected to the second conductive lead 110. In various embodiments, each of the plurality of resistors 112 may have the same resistance value, each of the plurality of resistors 112 may have different resistance values, or a portion of the plurality of resistors 112 may have the same resistance values and a portion of the plurality of resistors 112 may have different resistance values. In various embodiments, each of the plurality of resistors 112 (and also the plurality of conductive leads 106) may be connected together in parallel.

The resistors 112 may include one or more of a ceramic, carbon, ruthenium, positive temperature coefficient materials, dielectrics, ceramic oxides, intermetallic compounds, a relatively high resistance printable ink, or the like. Each of the conductive leads 106 and the resistors 112 may be capable of withstanding temperatures experienced in the multi-disk brake system 20 of FIG. 1. For example, the conductive leads 106 and the resistors 112 may be capable of withstanding temperatures up to 122 degrees Fahrenheit (122° F., 50° Celsius (C)), up to 212° F. (100° C.), up to 392° F. (200° C.), up to 932° F. (500° C.), up to 1,832° F. (1,000° C.), or the like. Where used in this context, the capability of withstanding temperatures means that the conductive leads 106 and the resistors 112 may remain functional up to the given temperature without variation in operation of more than 5 percent (5%), 10%, 15%, or the like.

The conductive leads 106 may be installed in the disk 100 in a variety of manners. For example, the conductive leads 106 (and/or the resistors 112) may be inserted into the disk 100 during formation or manufacture of the disk 100. That is, the conductive leads 106 may be formed integral with the disk 100. As another example, a portion of the outer surface 102 may be removed and the conductive leads 106 may be installed in the disk 100 after manufacture of the disk 100. In various embodiments, the conductive leads 106 may be embedded across an entire cross-section of the disk 100. For example, one or more slot or groove may be machine into the disk 100 such that the conductive leads are embedded within the one or more slot or groove.

In various embodiments, the disk 100 may have a liner or core. In such embodiments, the conductive leads 106 or traces may be located on a single side of the disk 100 and may be surface-mounted or installed, or may be embedded.

In various embodiments, a coating (such as a glass-based coating) may be applied to the outer surface 102 after installation of the conductive leads 106, thus hermetically sealing the conductive leads 106 within the disk 100. In various embodiments, one or more glass-based coating may be used as an oxide-protection system (OPS) and the conductive leads 106 may be applied over the coating, or may be sealed within the same coating of the OPS.

As another example, the conductive leads 106 may be installed on an outer edge 130 of the disk 100, thus simplifying installation of the conductive leads 106.

The system 101 may further include a current source 118. The current source 118 may include any device (such as a battery) or connection (such as to a control unit). Current from the current source 118 may flow through the plurality of conductive leads 106 and the plurality of resistors 112.

The system 101 may further include a voltage sensor 120. The voltage sensor 120 may include any device or element capable of detecting or receiving voltage across the plurality of resistors 112. In various embodiments, the voltage sensor 120 may be capable of detecting the voltage across the plurality of resistors 112 or may be leads that facilitate transmission of the voltage across the plurality of resistors 112.

The system 101 may further include a controller 122. The controller 122 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, two or more of the current source 118, the voltage sensor 120, and the controller 122 may be incorporated within the same device or element, or the functions of two or more of the current source 118, the voltage sensor 120, and the controller 122 may be performed by a single device or element.

The controller 122 may be electrically coupled to the voltage sensor 120. For example, the controller 122 may receive a signal corresponding to the detected voltage value from the voltage sensor 120 or may be coupled to leads that transmit the voltage to the controller 122.

Wear of the outer surface 102 may result in material loss of the outer surface 102 at an incursion depth 103. The incursion depth 103 may correspond to a depth of wear within the disk 100 from the outer surface 102. In response to the incursion depth 103, or wear, of the outer surface reaching the first conductive lead 108, the first conductive lead 108 may be disconnected from the first resistor 114. Because the resistors 112 may be connected to the voltage sensor 120 in a parallel configuration, the resistance (and thus the voltage across the resistors 112) of the resistors 112 changes. Furthermore, because each of the resistors 112 may have a different resistance value, the controller 122 may be capable of identifying which of the conductive leads 106 remains connected to the circuit. For example, the controller 122 may be programmed to determine which resistors 112 (and thus conductive leads 106) correspond to each voltage detected across the resistors 112. In various embodiments, the controller 122 may determine how many resistors 112 have been removed if each resistor 112 has the same value again based on the determined voltage.

The distance from the outer surface 102 to each of the conductive leads 106 may be known. Additionally, because the controller 122 can identify which resistors 112 remain connected to the circuit (based on the detected voltage), the controller may identify an approximate incursion depth 103 (i.e., amount of wear) or range of incursion depths 103 at the outer surface 102 at the location of the conductive leads 106. In various embodiments, the conductive leads 106 may extend across the entire outer surface 102 such that the controller 122 is capable of detecting a terminal incursion depth, or end point wear, of the outer surface 102.

In various embodiments, the system 101 may be designed to provide a minimum resolution corresponding to a minimum amount of wear of the disk 100 which can be detected by the system 101. For example, the minimum resolution may be 0.01 inches (0.254 mm), 0.005 inches (0.127 mm) 0.001 inches (0.0254 mm), or the like.

For example, if each of the conductive leads 106 are spaced apart by 0.079 inches (2 mm) and the detected voltage corresponds to a level at which the first resistor 114 is disconnected, the controller 122 may determine that the outer surface 102 of the disk 100 has lost between 0.079 inches (2 mm) and 0.16 inches (4 mm). As another example, if each of the conductive leads 106 are spaced apart by 0.079 inches (2 mm) and the detected voltage corresponds to a level at which the first resistor 114 and the second resistor 116 are disconnected, the controller 122 may determine that the outer surface 102 of the disk 100 has lost between 0.16 inches (4 mm) and 0.24 inches (6 mm).

In various embodiments, the system 101 may further include an output device 132. The output device 132 may receive the determined amount of wear of the disk 100 from the controller 122 and may output the determined amount of wear.

The system 101 may further include a second plurality of conductive traces 126, a second plurality of resistors 128, a second current source 134, a second voltage sensor 136, and a second controller 140. These elements may function identically to the first plurality of conductors 108, the first plurality resistors 112, the first current source 118, the first voltage sensor 120, and the first controller 122 in order to determine an amount of wear of the second outer surface 104 at the location of the plurality of conductors 108. In various embodiments, a single controller 122 may be coupled to all of the conductors and resistors on both outer surfaces 102, 104. In various embodiments, multiple systems 101 may be located on various locations of an outer surface of a disk in order to determine amounts of wear at the various locations.

Figure 3:
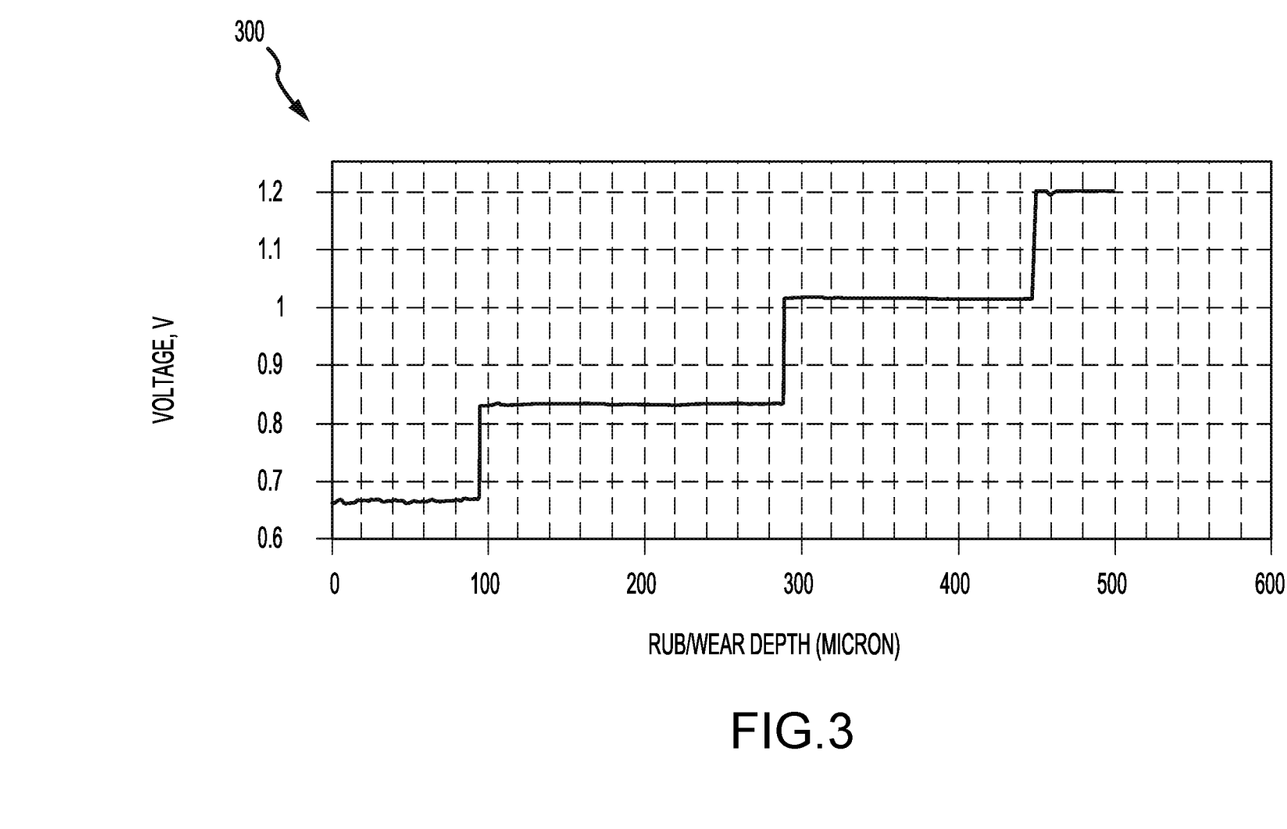
FIG. 3 is a graph illustrating a relationship between wear depth and voltage detected by the system of FIG. 2 in accordance with various embodiments.

Referring now to FIGS. 2 and 3, a graph 300 illustrates example voltage measurements that correspond to wear depth of the disk 100. As shown, a voltage of 0.65 V across the resistors 112 may correspond to a wear depth of between 0 inches and 0.004 inches (0 micrometers ($\mu m$) and 100 $\mu m$), a voltage of 0.85 V across the resistors 112 may correspond to a wear depth of between 0.004 inches and 0.012 inches (100 $\mu m$ and 300 $\mu m$), and the like.

Figure 4:
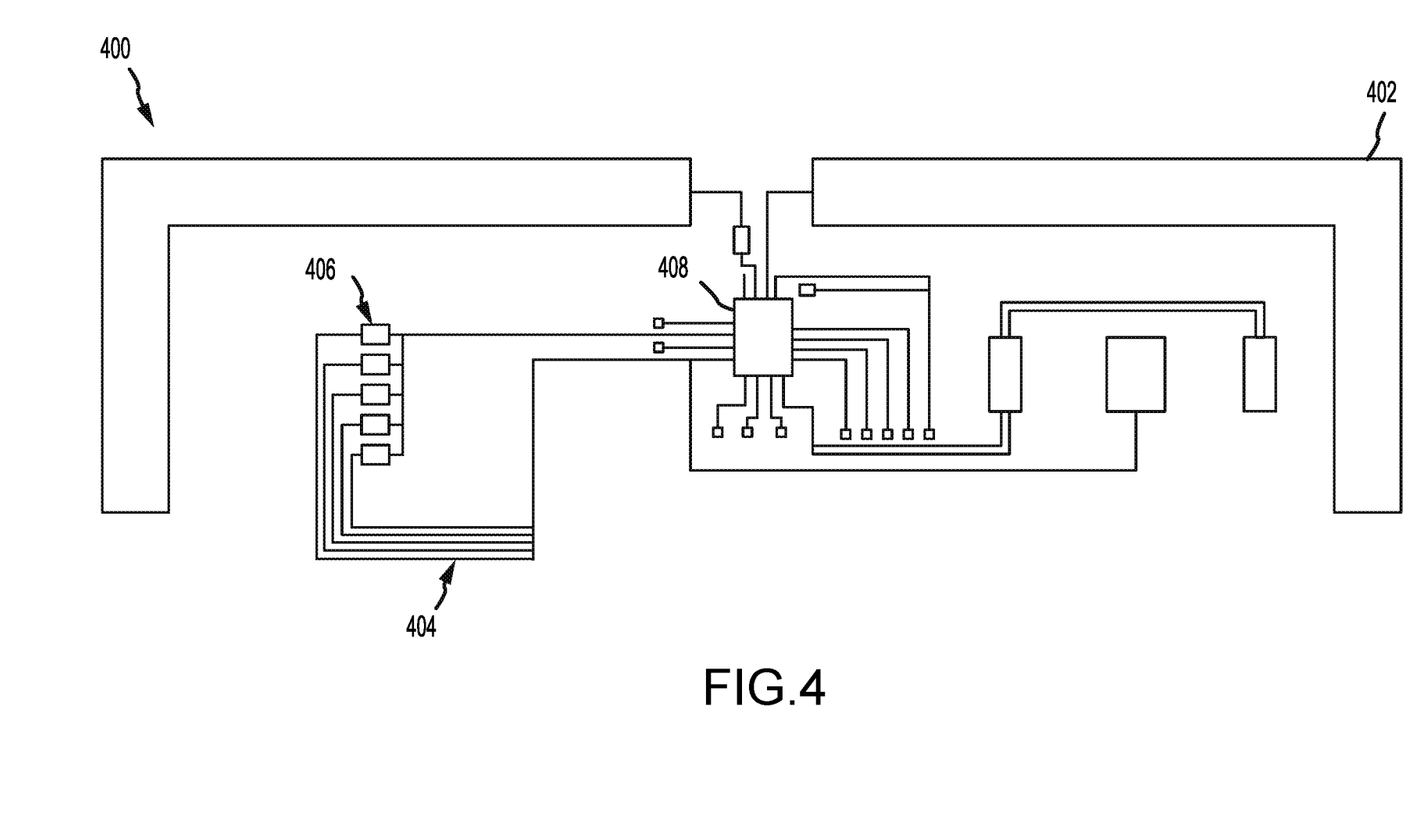
FIG. 4 is a perspective view of a wireless system for monitoring wear of a disk of a disk brake system in accordance with various embodiments.

Referring now to FIG. 4, a system 400 may be used to monitor incursion depth of a disk similar to the disk 100 of FIG. 2. The system 400 may include similar features as the system 101 of FIG. 2 and may be capable of wireless operation. The wireless system 400 may provide advantages such as ability to be used on a rotating friction disk.

The system 400 may include an antenna 402, such as a dipole antenna. The system 400 may further include a plurality of conductors 404 each designed to be positioned a different distance from an outer surface of a disk. The system 400 may also include a plurality of resistors 406 each coupled to one of the plurality of conductors 404. The system 400 may also include a controller 408, such as a radio frequency ID (RFID) chip. In various embodiments, the controller 408 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

The antenna 402 may be capable of communicating with another antenna which may be coupled to a remote power source and/or a remote logic device. The antenna 402 may receive a wireless power signal from the other antenna, and the power may be transferred to the controller 408. For example, the power signal may have a power value that is between 1 microwatt ($\mu W$) and 50 $\mu W$, between 3 $\mu W$ and 10 $\mu W$, or about 7 $\mu W$. Where used in this context, about refers to the referenced value plus or minus 10% of the referenced value.

The controller 408 may apply the received power as current through the resistors 406. The controller 408 may also be capable of detecting or determining the voltage across the resistors 406. In various embodiments, the controller 408 may control the antenna 402 to transmit the detected voltage across the resistors 406. A remote logic device may receive the detected voltage and determine an amount of wear of the corresponding disk.

In various embodiments and based on the determined voltage, the controller 408 (or a second controller) may identify which resistors 406 remain connected to the controller 408 and which have become disconnected. Based on the known distance between the outer surface of the disk and each of the conductors 404, and based on the detected voltage, the controller 408 may determine how much wear the disk has experienced. The controller 408 may control the antenna 402 to transmit the determined amount of wear.

Figure 5:
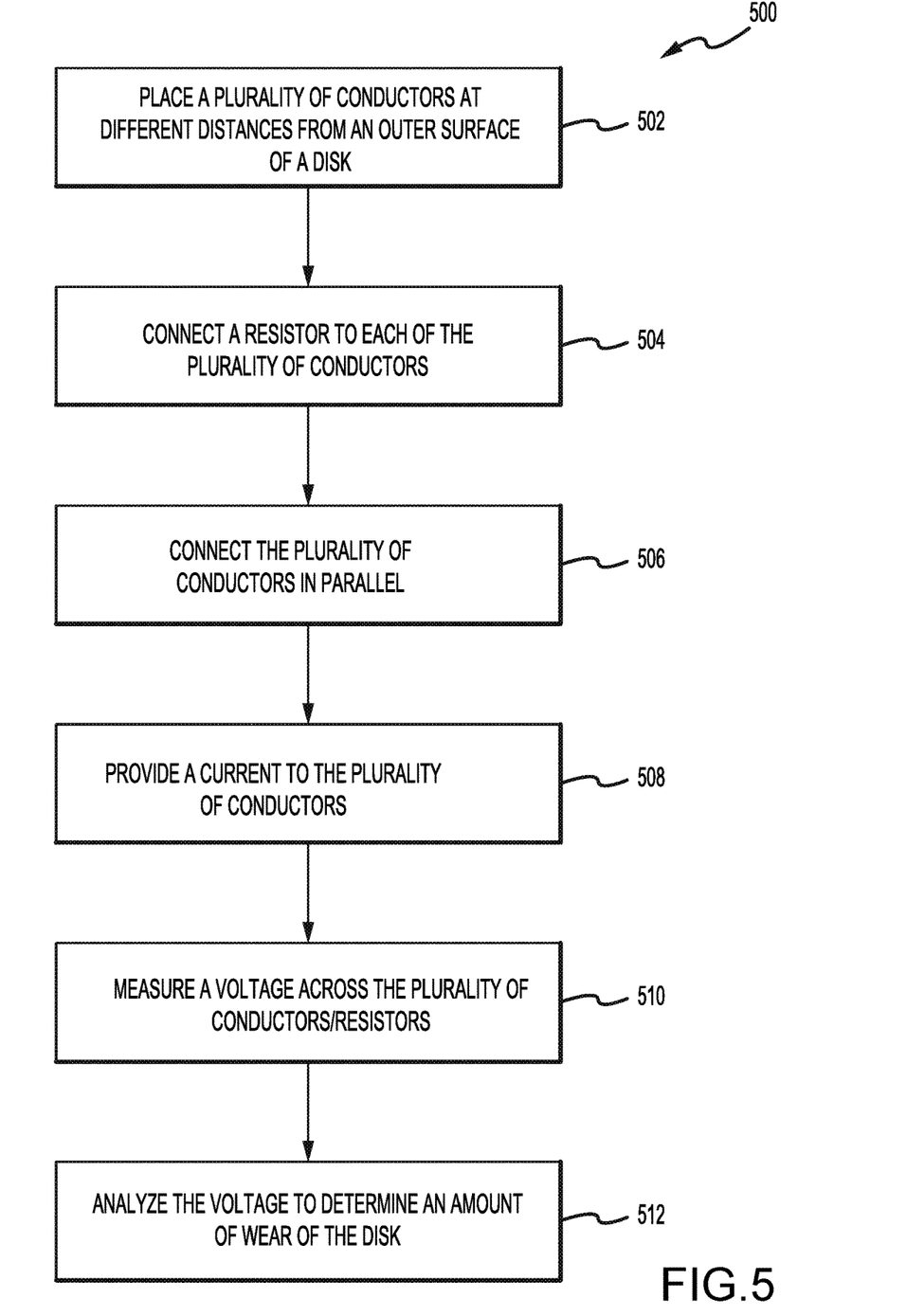
FIG. 5 is a flowchart illustrating a method for monitoring wear of a disk of a disk brake system in accordance with various embodiments.

Turning now to FIG. 5, a method 500 for monitoring incursion depth, or wear, of a disk having an outer surface is shown. The method 500 may be performed by components similar to the system 101 of FIG. 2. In block 502, a plurality of conductors may be placed, installed, or the like at different distances from an outer surface of a disk to be used in a disk brake system. In block 504, a plurality of resistors may be connected to the plurality of conductors such that each conductor is connected to at least one of the resistors. In block 506, the plurality of conductors may be connected together in parallel such that at least some of the plurality of resistors are also connected together in parallel.

In block 508, an electrical current may be provided to the plurality of conductors such that the electrical current may run through the resistors. In block 510, a voltage may be measured across the plurality of resistors. In block 512, a controller may analyze the detected voltage across the resistors in order to determine an amount of wear of the disk.

Figure 6:
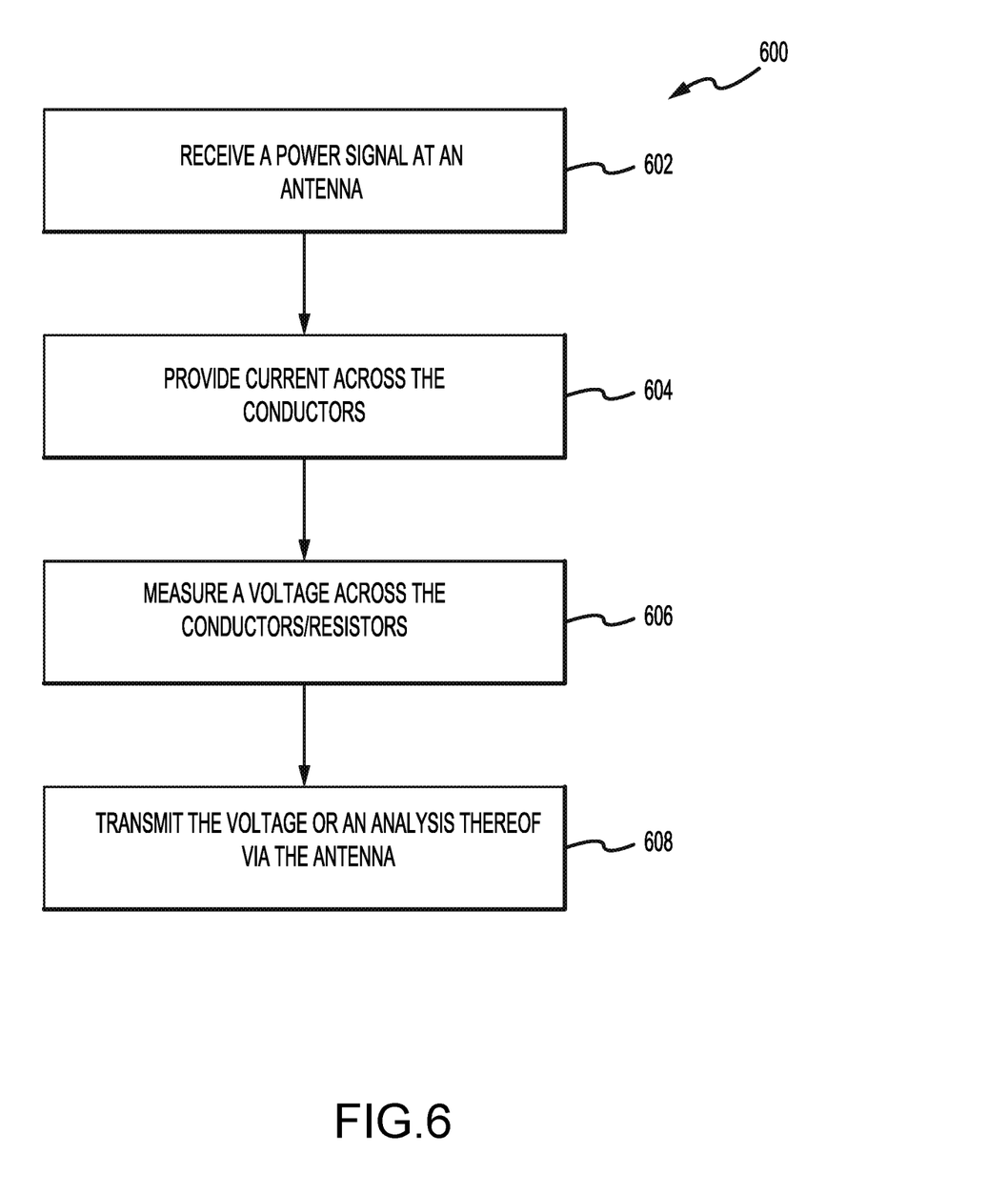
FIG. 6 is a flowchart illustrating a method for wireless wear monitoring of a disk of a disk brake system in accordance with various embodiments.

Referring to FIG. 6, a method 600 for wireless monitoring wear of a disk is shown. The method 600 may be performed by a system similar to the system 400 of FIG. 4. In block 602, an antenna coupled to a controller may receive a wireless power signal. The power signal may be used to power the controller. In block 604, the controller may generate a current to be applied through the conductors to the resistors based on the received power signal. In block 606, a voltage across the conductors or resistors may be measured or detected. In block 608, the voltage (or an analysis of the voltage corresponding to wear depth) may be transmitted by the controller via the antenna.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for monitoring incursion depth of a disk having an outer surface for use in a disk brake system, the system comprising:
   the disk formed from a carbon material;
   a plurality of conductive leads formed from the carbon material and each configured to be located at different distances from the outer surface of the disk; and
   a plurality of resistors each coupled to one of the plurality of conductive leads such that total resistance across the plurality of conductive leads changes in response to disconnection of one or more of the plurality of conductive leads caused by wearing of the outer surface of the disk.

2. The system of claim 1, further comprising:
   an antenna configured to transmit an output signal and receive a power signal; and
   a controller coupled to the antenna and the plurality of conductive leads and configured to receive the power signal from the antenna and to control the antenna to transmit the output signal corresponding to the total resistance across the plurality of conductive leads.

3. The system of claim 1, further comprising a current source coupled to the plurality of conductive leads and a controller coupled to the plurality of conductive leads and configured to detect a voltage across the plurality of conductive leads, the voltage across the plurality of conductive leads corresponding to the total resistance across the plurality of conductive leads.

4. The system of claim 1, wherein each of the plurality of resistors are coupled together in parallel.

5. The system of claim 4, wherein each of the plurality of resistors have a different resistance value.

6. The system of claim 1, wherein the disk is a rotatable friction disk or a non-rotatable friction disk.

7. The system of claim 1, further comprising:
   a second plurality of conductive leads each configured to be located at different distances from a second outer surface of the disk; and
   a second plurality of resistors each coupled to one of the second plurality of conductive leads such that a second total resistance across the second plurality of conductive leads changes in response to disconnection of one or more of the second plurality of conductive leads caused by wearing of the second outer surface of the disk.

8. A disk for use in a disk brake system, the disk comprising:
   an outer surface;
   a plurality of conductors formed from a carbon material and located at different distances from the outer surface of the disk; and
   a resistor coupled to each one of the plurality of conductors such that total resistance across the plurality of conductors changes in response to disconnection of one or more of the plurality of conductors caused by wearing of the outer surface of the disk, wherein the disk is formed from the carbon material.

9. The disk of claim 8, further comprising:
   an antenna configured to transmit an output signal and receive a power signal; and
   a controller coupled to the antenna and the plurality of conductors and configured to receive the power signal from the antenna and to control the antenna to transmit the output signal corresponding to the total resistance across the plurality of conductors.

10. The disk of claim 8, further comprising a current source coupled to the plurality of conductors and a controller coupled to the plurality of conductors and configured to detect a voltage across the plurality of conductors, the voltage across the plurality of conductors corresponding to the total resistance across the plurality of conductors.

11. The disk of claim 8, wherein the resistor coupled to each one of the plurality of conductors are coupled together in parallel.

12. The disk of claim 11, wherein the resistor coupled to each one of the plurality of conductors have a different resistance value.

13. The disk of claim 8, wherein the disk is a rotatable friction disk or a non-rotatable friction disk.

14. The disk of claim 8, further comprising:
a second outer surface;
a second plurality of conductors each located at different distances from the second outer surface of the disk; and
a second resistor coupled to each one of the second plurality of conductors such that a second total resistance across the second plurality of conductors changes in response to disconnection of one or more of the second plurality of conductors caused by wearing of the second outer surface of the disk.

15. A method for monitoring incursion depth of a disk having an outer surface for use in a disk brake system, the method comprising:
providing a current to a plurality of conductive leads that are each formed from a carbon material, each placed at different distances from the outer surface of the disk, and each connected to one of a plurality of resistors;
measuring a voltage across the plurality of conductive leads; and
analyzing the voltage to determine an amount of wear of the disk, wherein the disk is formed from the carbon material.

16. The method of claim 15, wherein each of the plurality of resistors are coupled together in parallel.

17. The method of claim 16, wherein each of the plurality of resistors have a different resistance value.

18. The method of claim 15, wherein the disk is a rotatable friction disk or a non-rotatable friction disk.

* * * * *